(12) United States Patent
Konya et al.

(10) Patent No.: US 6,387,302 B1
(45) Date of Patent: May 14, 2002

(54) METHOD OF PRODUCING SPHERICAL SILICA POWDER

(75) Inventors: Yoshiharu Konya; Koichiro Watanabe; Susumu Ueno, all of Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/935,593

(22) Filed: Aug. 24, 2001

(30) Foreign Application Priority Data

Aug. 31, 2000 (JP) ........................................ 2000-262431

(51) Int. Cl.$^7$ .............................................. C01B 33/18
(52) U.S. Cl. ........................................ 264/15; 423/335
(58) Field of Search .............................. 264/15; 423/335

(56) References Cited

U.S. PATENT DOCUMENTS 5,611,833 A * 3/1997 Brahmbhatt et al. .......... 264/15
6,054,073 A * 4/2000 Kobayashi et al. ........... 264/15

FOREIGN PATENT DOCUMENTS

| JP | A2-199013 | 8/1990 |
| JP | B2-2670628 | 7/1997 |
| JP | A10-95607 | 4/1998 |

* cited by examiner

Primary Examiner—Mary Lynn Theisen
(74) Attorney, Agent, or Firm—Birch, Stewart, Kolasch & Birch, LLP

(57) ABSTRACT

Spherical silica powder is produced by feeding silica powder having an average particle size of 0.3–40 μm to a burner flame formed with a flammable gas so as to continuously melt and spheroidize the particles within the flame. The use of a non-halogenated siloxane and/or alkoxysilane as an auxiliary flame-generating source raises the flame temperature and increases the length of the composite flame formed by combustion of the fuel gas with the siloxane or alkoxysilane. Moreover, the fine particles of silica that form as a result of siloxane or alkoxysilane combustion unite and coalesce with the particles of starting silica. These effects accelerate melting and spheroidization of the starting silica powder, resulting in thermally efficient and cost-effective spherical silica powder production.

3 Claims, 2 Drawing Sheets

METHOD OF PRODUCING SPHERICAL SILICA POWDER

BACKGROUND OF THE INVENTION

1. Field of the Invention

The present invention relates to a method of producing spherical silica powder which can be used for such purposes as a filler in semiconductor encapsulants.

2. Prior Art

Silica powders are used as fillers in semiconductor encapsulants. The increasingly high level of integration in semiconductors has created a need for encapsulants with better mold-filling properties that now makes it essential to use spherical fused silica powders. A number of methods for producing spherical fused silica powder by introducing silica powder to a burner flame are described in the prior art. For example, JP-A2-199013 (allowed as JP 2670628) and JP-A 10-95607 disclose processes of passing a starting silica powder through a flame formed by the combustion of a flammable gas and oxygen, thereby melting and spheroidizing silica particles.

In general methods customarily used in the art, the starting silica powder is fed to a burner flame formed by the combustion of oxygen with a flammable gas such as propane. The combustion flame imparts heat to the powder, causing it to melt and spheroidize. Thermal power sufficient to raise the temperature to the melting point or higher is required to melt the silica powder. In addition, a long flame length is needed to uniformly melt silica powder having a broad particle size distribution. For these reasons, use is made of a flammable gas which generates more heat than the amount theoretically required to melt the starting silica.

However, using large amounts of flammable gas and oxygen lowers the thermal energy efficiency, in addition to which it raises costs and is thus uneconomical. On the other hand, holding down the thermal power of a combustion flame shortens the length of the flame. In a flame of this type, fine silica particles can be spheroidized because they have a low heat capacity and a long retention time in the flame. However, coarse silica particles do not readily spheroidize on account of their large heat capacity and their short retention time in the flame. Accordingly, a need has been felt for a cost-effective method of producing spherical fused silica powder of any particle size suitable for use as a filler in semiconductor encapsulants which requires less flammable gas and has a better thermal energy efficiency.

SUMMARY OF THE INVENTION

It is therefore an object of the invention to provide a method which is capable of cost-effectively producing spherical fused silica powder that can be used for such purposes as a filler in semiconductor encapsulants.

After thoroughly investigating methods for feeding silica powder to a flame and continuously melting and spheroidizing the powder in the flame, the inventor has found that using a flame formed by the oxidative combustion of a non-halogenated siloxane or alkoxysilane as an auxiliary flame in the production process boosts heat generation, reduces the amount of flammable gas required, and increases the flame temperature and length. The result is a higher thermal energy efficiency and excellent cost effectiveness. Moreover, the core particles of silica that form as a result of siloxane or alkoxysilane combustion coalesce and grow on surfaces of silica particles, promoting spheroidization.

Accordingly, the invention provides a method of producing spherical silica powder, in which method silica powder having an average particle size of 0.3 to 40 μm is fed to a burner flame formed with a flammable gas so as to continuously melt and spheroidize the particles within the flame. A non-halogenated siloxane and/or a non-halogenated alkoxysilane is fed to the flame as an auxiliary flame-generating source.

BRIEF DESCRIPTION OF THE DRAWINGS

The objects, features and advantages of the invention will become more apparent from the following detailed description, taken in conjunction with the accompanying drawings.

DESCRIPTION OF THE PREFERRED EMBODIMENTS

Figure 1:
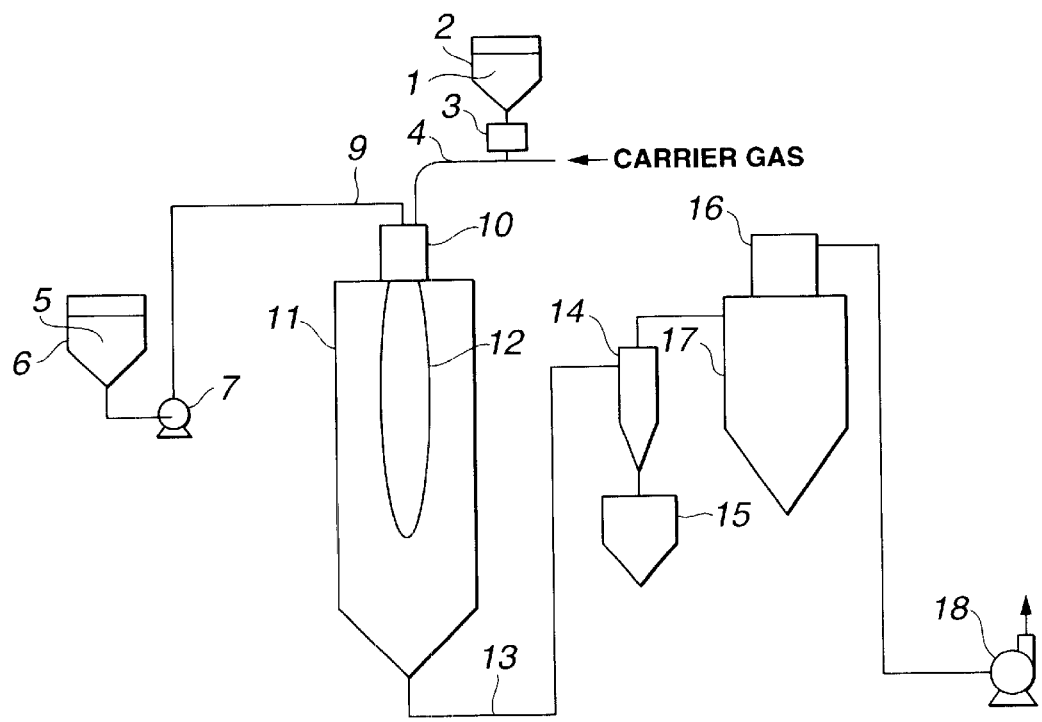
FIG. 1 is a schematic sectional view showing an example of a production system such as may be used to work the present invention.

The inventive method of producing spherical silica powder involves feeding silica particles to a burner flame formed with a flammable gas, and continuously melting and spheroidizing the silica particles in the flame.

To achieve a high-purity product, it is desirable though not essential for the silica powder used as the starting material to have a purity of at least 99.9%.

The silica powder (or particles) used as the starting material has an average particle size of 0.3 to 40 μm, and preferably 0.3 to 30 μm. A starting silica powder having a smaller particle size than the final silica powder product is used to allow the spherical silica powder to be controlled to a particle size suitable for use as a filler in semiconductor encapsulants. The starting silica powder is finely divided and thus agglomerates into larger particles, although this is acceptable so long as the particles are of a size that allows such agglomerates to break down and disperse in a stream of air. The starting silica powder may be crystalline silica, fused silica, quartz or synthetic silica capable of being adjusted to the required particle size by a suitable process such as milling. Synthetic silica is generally in the form of a fine powder. At a particle size of at least 0.3 μm, it disaggregates to the primary particles in a stream of gas, and can thus be used. On the other hand, coarse particles require a large amount of heat for melting and spheroidization. Moreover, they fall more rapidly through the flame than smaller particles and thus have a short residence time in the flame, lowering the efficiency of spheroidization.

The starting silica powder is carried by oxygen gas or air and fed through the burner to the flame. In working the invention, the silica powder may be melted in the flame by a known method wherein hydrogen gas or a hydrocarbon gas such as propane is used as the fuel gas for the burner flame, and an oxygen-containing gas such as oxygen or air is used as a combustion-supporting gas.

The melting point of silica differs according to its form. For example, crystalline cristobalite has a melting point of 1,723° C., and quartz has a melting point of 1,423° C. Therefore, to melt and spheroidize the starting silica, it is essential that a high-temperature, high-heat flame be formed which has enough heat to hold the flame temperature at these melting points or higher and melt the silica powder. The combustion reactions and heats of combustion when propane gas and hydrogen gas are used as the combustion gases are as follows:

$$C_3H_8(g)+5O_2(g) \rightarrow 3CO_2(g)+4H_2O(g) \Delta H_R=-488 \text{ kcal/mol}$$

$$H_2(g)+\tfrac{1}{2}O_2(g) \rightarrow H_2O(g) \Delta H_R=-57.8 \text{ kcal/mol}$$

However, due to cooling of the flame, such as from the sensible heat of surplus gas and heat removal through the furnace walls, these fuel gases, when used by themselves, must be fed in excess quantities to completely melt and spheroidize the silica powder. This is economically disadvantageous.

The present invention overcomes this problem by feeding to the flame a non-halogenated siloxane or alkoxysilane as an auxiliary flame source.

The siloxane used for this purpose may be a non-halogenated linear organosiloxane of general formula (1):

$$(R^1)_3SiO[SiR^2R^3O]_mSi(R^1)_3 \qquad (1),$$

a non-halogenated cyclic organosiloxane of general formula (2):

$$[SiR^2R^3O]_n \qquad (2),$$

or a mixture thereof.

In the above formulas, $R^1$, $R^2$ and $R^3$ are each independently a monovalent hydrocarbon group, an alkoxy group or a hydrogen atom; m is 0 or a positive integer; and n is an integer of at least 3.

Monovalent hydrocarbon groups represented by $R^1$ to $R^3$ include $C_{1-6}$ alkyl groups, alkenyl groups such as vinyl, and phenyl groups. Of these, lower alkyls such as methyl, ethyl and propyl are preferred. Methyl is especially preferred. Suitable alkoxy groups include those having 1 to 6 carbons, such as methoxy and ethoxy, of which methoxy is especially preferred. The letter m is 0 or a positive integer, and preferably an integer from 0 to 100. The letter n is an integer of at least 3, and preferably an integer from 3 to 7.

Examples of suitable organosiloxanes include hexamethyldisiloxane, octamethyltrisiloxane, octamethylcyclotetrasiloxane and decamethylcyclopentasiloxane.

Exemplary non-halogenated alkoxysilanes include those of the general formula (3):

$$R^1_pSi(OR^2)_{4-p} \qquad (3)$$

wherein $R^1$ and $R^2$ are as defined above, and preferably monovalent hydrocarbon groups, and p is 0, 1, 2 or 3.

The above-described siloxane and alkoxysilane may be used singly or in combinations of two or more thereof. The siloxanes and alkoxysilanes which have been purified are preferred and highly suitable as auxiliary flame-generating gases because they are of high purity and free of impurities such as metals, and they contain no halogens and thus do not generate corrosive gases, eliminating the need for special-grade materials in the combustion furnace and exhaust system. Moreover, treatment of the exhaust gases generated by their combustion is easy.

The above siloxanes and alkoxysilanes contain many hydrocarbon groups and alkoxy groups on the molecules, and thus have large heats of combustion. For example, the combustion reactions and heats of combustion for hexadimethylsiloxane, octamethylcyclotetrasiloxane and tetramethoxysilane are as follows.

$$(CH_3)_3SiOSi(CH_3)_3(g)+12O_2(g) \rightarrow 2SiO_2(s)+6CO_2(g)+9H_2O(g) \Delta H_R=-1,389 \text{ kcal/mol}$$

$$[(CH_3)_2SiO]_4(g)+16O_2(g) \rightarrow 4SiO_2(s)+8CO_2(g)+12H_2O(g) \Delta H_R=-1,974 \text{ kcal/mol}$$

$$Si(OCH_3)_4(g)+6O_2(g) \rightarrow SiO_2(s)+4CO_2(g)+6H_2O(g) \Delta H_R=-722 \text{ kcal/mol}$$

These large heats of combustion are thus available for use. Moreover, because the siloxane or alkoxysilane receives heat from the combustion gas flame and is subjected to oxidative combustion while undergoing vaporization and pyrolysis, the combustion flame lengthens. This increases the residence time of the starting silica powder in the flame, which promotes melting and spheroidization of the silica powder. Use of the above siloxanes and alkoxysilanes provides also the further advantage that the silica powder formed by their oxidative combustion coalesces with the molten starting silica powder and is ultimately recovered as part of the final powder product.

It is desirable for the siloxane and/or alkoxysilane to be supplied in such an amount that the flame formed by its combustion together with the fuel gas provides the temperature and heat necessary to melt and spheroidize the starting silica powder. To achieve good thermal efficiency, it is preferable for most of the necessary heat to be furnished by the siloxane or alkoxysilane's heat of combustion, although fuel gas should be supplied as a combustion-assisting gas at least to assure stable combustion of the siloxane or alkoxysilane. Hence, a molar ratio of siloxane or alkoxysilane to fuel gas within a range of 1:3 to 10:1, and especially 1:2 to 7:1, is preferred. The core particles of fine silica formed by the combustion of siloxane or alkoxysilane cover the surface of the starting silica powder and coalesce therewith, taking part in the spheroidization of that powder. However, if too much siloxane or alkoxysilane is supplied, the surplus fine silica acts as a binder, giving rise to fusion necking between particles of the starting silica and impairing spheroidization. For this reason, it is advantageous to adjust the amount of siloxane or alkoxysilane supplied so that the amount of silica formed by combustion of the siloxane or alkoxysilane is less than the amount of starting silica.

The siloxane or alkoxysilane may be supplied to an atomizing nozzle as a liquid, atomized into fine droplets, then fed to the flame and burned. Alternatively, the siloxane or alkoxysilane may be heated to form a vapor which is then fed to the flame and burned.

Atomization of the siloxane or alkoxysilane by passing it in liquid form through an atomizing nozzle may be carried out under the pressure of the liquid itself, using an atomizing medium such as air or steam, or under centrifugal force. The atomized droplets of siloxane or alkoxysilane are heated by the combustion flame of the combustion-assisting gas or by the combustion flame of the siloxane or alkoxysilane itself, and are thus subjected to oxidative combustion while undergoing vaporization and pyrolysis. Complete vaporization or pyrolysis and combustion of the droplets of atomized siloxane or alkoxysilane is best achieved at a small droplet size. A droplet size of not more than 100 μm, and especially not more than 50 μm, is preferred. To achieve this, the siloxane should have a viscosity at 25° C. of preferably not more than 500 cs, and most preferably not more than 200 cs.

If, instead, the siloxane or alkoxysilane is fed to the flame as a vapor, the method used may be one in which the siloxane or alkoxysilane is heated and carried by bubbling with an inert gas such as nitrogen, or one in which a superheated vapor of the siloxane or alkoxysilane is mixed with an inert gas such as nitrogen and fed to the flame. The siloxane or alkoxysilane may be fed to the flame from the same burner as that used to feed the starting silica powder, or from a different burner.

A composite flame of the fuel gas combustion flame and the siloxane or alkoxysilane auxiliary flame is formed by feeding, as a combustion-supporting gas, an oxygen-containing gas which includes also carrier gas for dispersing and carrying the starting silica powder from the burner, so as to supply at least the stoichiometric amount of oxygen required for combustion. However, if the amount of oxygen-containing gas fed for this purpose is insufficient, it may be supplemented by the uptake of outside air along the periphery of the burner. Too little oxygen is undesirable in terms of safety and quality because it causes incomplete combustion and can lead to the presence of undesirable substances such as carbon and carbon monoxide in the product or the exhaust gases. On the other hand, too much oxygen lowers the flame temperature. Accordingly, the combined amount of oxygen, made up of the oxygen which is fed to the burner and the oxygen in the outside air that is drawn in, is preferably from 1 to 4 times, and most preferably from 1.2 to 3.5 times, the stoichiometric amount.

A composite flame in which the siloxane or alkoxysilane is used as the auxiliary flame provides the following advantages.

(1) The siloxane or alkoxysilane's large heat of combustion increases the flame temperature, enabling sufficient heat to be provided for melting and spheroidization of the starting silica.

(2) A composite flame formed with the siloxane or alkoxysilane and a combustion-assisting gas lengthens the combustion flame, thereby increasing the residence time of the starting silica powder within the flame.

(3) The silica formed by the combustion of siloxane or alkoxysilane unites and coalesces with the starting silica, thus helping to promote melting and spheroidization of the silica powder. Additional advantages are also achieved in terms of thermal efficiency and economy. Such advantages include:

(4) reduction in the use of fuel gas, and (5) recovery as finished product of all the silica formed by burning the siloxane or alkoxysilane.

The powder product may be collected from the combustion waste gases in the flue line by the suitable use of collection devices such as a cyclone and a bag filter.

Figure 2:
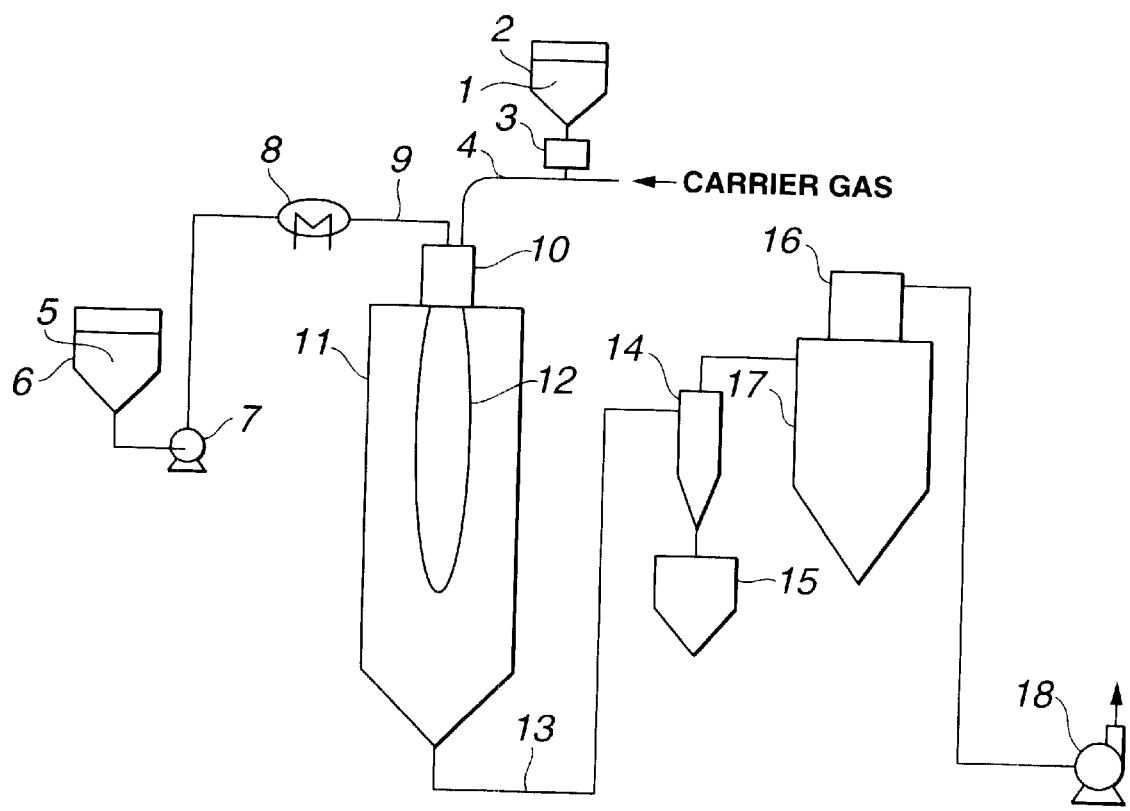
FIG. 2 is a schematic sectional view showing another example of a production system that may be used in the invention.

The production apparatus used to manufacture the spherical fused silica powder of the invention is described while referring to the attached diagrams. FIGS. 1 and 2 show schematic sectional views of different examples of production systems suitable for this purpose. FIG. 1 illustrates a production method in which the siloxane or alkoxysilane is fed to the burner as a liquid and is atomized and burned. FIG. 2 illustrates a production example in which the siloxane or alkoxysilane is heated to form a vapor, which is then fed to the burner for combustion. In FIG. 1, a starting silica powder 1 is admitted from a starting material hopper 2 with a metering feeder 3, then dispersed and carried by a carrier gas and fed through a feed line 4 to a burner 10. At the same time, a siloxane or alkoxysilane 5 is passed by a metering pump 7 from a tank 6 through a feed line 9 and to a burner 10. The starting silica powder 1 is introduced to a composite flame 12 formed in a combustion furnace 11 by a fuel gas and the siloxane or alkoxysilane. The powder 1 is melted in the flame 12 and passes, together with the silica formed by combustion of the siloxane or alkoxysilane, through a flue line 13 to a cyclone 14 and a bag filter 16, where it is separated off and collected, after which it is recovered in recovery units 15 and 17, respectively. The exhaust gases are then discharged by an exhaust unit 18. The production system shown in FIG. 2 is like that in FIG. 1, except that a vaporizer 8 is provided on the line feeding the siloxane 5 to the burner 10.

EXAMPLE

Examples and comparative examples are given below by way of illustration and not by way of limitation.

Example 1

A production system of the type shown in FIG. 1 was used. The combustion furnace 11 was a cylindrical stainless tube having an inside diameter of 400 mm and a height of 3,000 mm, and lined with alumina heat-insulating material. The pressure within the furnace 11 was set to a negative pressure of 0.5 kPa by evacuation with an exhaust unit 18. Propane gas and oxygen gas were fed from a burner 10 at respective rates of 0.5 $Nm^3/h$ and 20 $Nm^3/h$ to form a flame. Next, 20 kg/h of crystalline silica powder having an average particle size of 15 $\mu$m and a purity of 99.6% was fed to the burner 10 by a metering feeder 3, and introduced to the flame through the burner 10 by dispersion and entrainment with 6 $Nm^3/h$ of oxygen as the carrier gas. At the same time, hexamethyldisiloxane was fed at a rate of 10 kg/h by a metering pump 7, atomized by 3 $Nm^3/h$ of air from an atomizing nozzle mounted on the burner 10, and burned in a composite flame 12 formed by combustion of the propane gas and siloxane. The molten silica powder was cooled in a flue line 13, then recovered with collection and recovery devices. The recovered silica powder had a purity of 99.6%, an average particle size of 22 $\mu$m, and was confirmed by x-ray diffraction analysis to be amorphous. The powder was examined under an optical microscope, and the particle shapes were analyzed using a particle shape analyzer (Luzex F, manufactured by Nireco Co., Ltd.), whereupon all the particles were found to be spherical with a breadth-to-length ratio of at least 0.85.

Example 2

A production system of the type shown in FIG. 2 was used. This system was substantially the same as that used in Example 1, except that a vaporizer was installed on the siloxane feed line. A flame was formed by feeding 0.3 $Nm^3/h$ of propane gas and 22 $Nm^3/h$ of oxygen gas from a burner 10. Next, crystalline silica having an average particle size of 18 $\mu$m and a purity of 99.6% was fed to the burner 10 by a metering feeder 3 at a rate of 15 kg/h, and introduced to the flame through the burner 10 by dispersion and entrainment with 5 $Nm^3/h$ of oxygen as the carrier gas. At the same time, hexamethyldisiloxane was fed at a rate of 8 kg/h by a metering pump 7, converted to superheated vapor by a vaporizer 8, mixed with 2 $Nm^3/h$ of nitrogen gas and carried to a burner 10, where it was burned in a composite flame 12 formed by combustion of the propane gas and siloxane. The molten silica powder was cooled in a flue line 13, then recovered with collection and recovery devices. The recovered silica powder had a purity of 99.6%, an average particle size of 20 $\mu$m, and was confirmed by x-ray diffraction analysis to be amorphous. The powder was examined under an optical microscope, and the particle shapes were analyzed using a particle shape analyzer, whereupon all the particles were found to be spherical with a breadth-to-length ratio of at least 0.85.

Example 3

The same production system was used as in Example 1. The pressure within the furnace 11 was set to a negative pressure of 0.6 kPa by evacuation with the exhaust unit 18. Hydrogen gas and oxygen gas were fed in at respective rates of 1.5 $Nm^3/h$ and 20 $Nm^3/h$ to a burner 10 to form a flame. Next, 10 kg/h of crystalline silica powder having an average particle size of 20 $\mu$m and a purity of 99.6% was fed to the burner 10 by a metering feeder 3, and introduced to the flame through the burner 10 by dispersion and entrainment with 6 $Nm^3/h$ of oxygen as the carrier gas. At the same time, methyltrimethoxysilane was fed at a rate of 13 kg/h by a metering pump 7, atomized by 5 Nm$^3$/h of air from an atomizing nozzle mounted on the burner 10, and burned in a composite flame 12 formed by combustion of the hydrogen gas and methyltrimethoxysilane. The molten silica powder was cooled in a flue line 13, then recovered with collection and recovery devices. The recovered silica powder had a purity of 99.6%, an average particle size of 22 μm, and was confirmed by x-ray diffraction analysis to be amorphous. The powder was examined under an optical microscope, and the particle shapes were analyzed, whereupon all the particles were found to be spherical with a breadth-to-length ratio of at least 0.83.

Comparative Example 1

The same production system was used as in Example 1. No siloxane or alkoxysilane was used to form an auxiliary flame, and instead, the propane gas and oxygen gas feed rates were set at 4.4 Nm$^3$/h and 28 Nm$^3$/h to achieve the same heat of combustion. Aside from these changes, combustion, melting and recovery of the final powder product were carried out at the same furnace pressure, with the same crystalline silica powder, and at the same carrier gas properties and feed rate as in Example 1. The recovered silica powder had a particle size of 17 μm, a purity of 99.6%, and was found by x-ray diffraction analysis to contain both amorphous and crystalline elements. Examination of the powder under an optical microscope revealed that particles smaller than 10 μm were substantially spherical, with a breadth-to-length ratio of 0.80 or more. However, particles 10 μm to 40 μm in size had an average breadth-to-length ratio of 0.65, and thus had a basically angular shape with rounded edges. Particles larger than 40 μm retained essentially the same shape as the particles in the starting material.

As described above and demonstrated in the foregoing examples, the amount of heat generated by oxidative combustion when siloxane or alkoxysilane is used as an auxiliary flame source raises the flame temperature and increases the length of the composite flame formed by combustion of the fuel gas with the siloxane or alkoxysilane. Moreover, the fine particles of silica that form as a result of siloxane or alkoxysilane combustion unite and coalesce with the particles of starting silica. These and related effects serve to accelerate melting and spheroidization of the starting silica powder, making it possible to achieve a production method that has a good thermal energy efficiency and is very cost-effective.

Japanese Patent Application No. 2000-262431 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method of producing spherical silica powder, comprising the step of feeding silica powder having an average particle size of 0.3 to 40 μm to a burner flame formed with a flammable gas so as to continuously melt and spheroidize the particles within the flame, wherein a non-halogenated siloxane or a non-halogenated alkoxysilane or a combination of both is fed to the flame as an auxiliary flame-generating source.

2. The method of claim 1, wherein the non-halogenated siloxane or alkoxysilane is burned as a vapor or an atomized liquid.

3. The method of claim 1, wherein the non-halogenated siloxane or alkoxysilane is used in a molar ratio, based on the fuel gas, of 1:3 to 10:1.

* * * * *